No. 664,388. Patented Dec. 25, 1900.
H. DRÖSSE.
SHAVING APPARATUS.
(Application filed July 30, 1900.)
(No Model.)
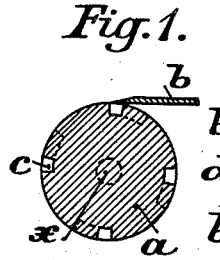
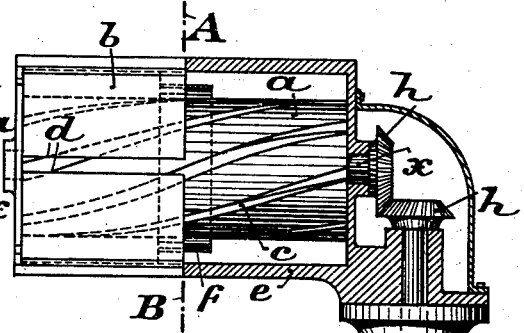
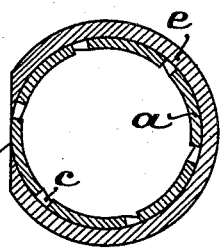
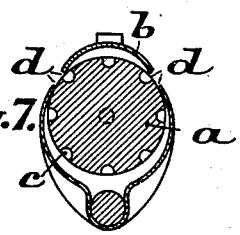
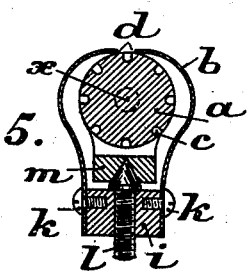
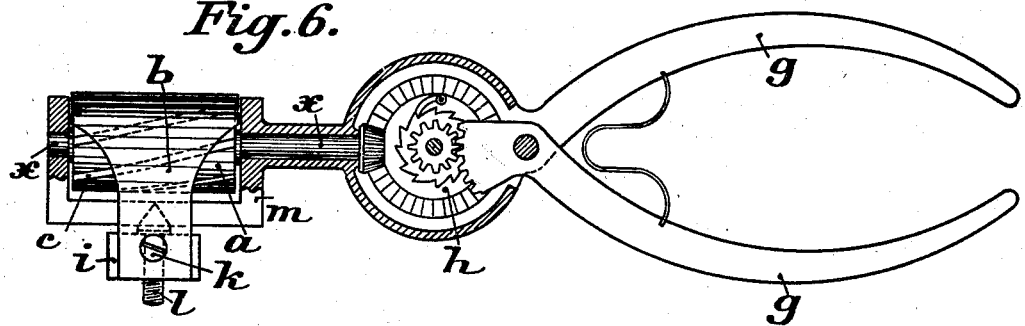
WITNESSES
Ella L. Gilee
Otto Munk
INVENTOR
Hermann Drösse
by ATTORNEYS
Richards &Co

UNITED STATES PATENT OFFICE.

HERMANN DRÖSSE, OF CHARLOTTENBURG, GERMANY.

SHAVING APPARATUS.

SPECIFICATION forming part of Letters Patent No. 664,388, dated December 25, 1900.

Application filed July 30, 1900. Serial No. 25,318. (No model.)

*To all whom it may concern:*

Be it known that I, HERMANN DRÖSSE, manufacturer, a subject of the German Emperor, residing at 39 Berlinerstrasse, Charlottenburg, near Berlin, Germany, have invented certain new and useful Improvements in Shaving Apparatus; and I do hereby declare the following to be a full, clear, and exact description of the invention, such as will enable others skilled in the art to which it appertains to make and use the same.

As a variation on the razor-guards for preventing the blade from cutting the skin, which consists of a comb or railing covering the blade, there have been constructed razors in which blades rotate in a casing provided with a narrow slit, (German Patents Nos. 100,735 and 107,932.) The action of apparatus of this latter kind is the same as that of the ordinary razor-blade, the hair being mowed down. The protection afforded is due to the fact that the blades cannot project beyond their casing, and their cutting action is limited to those parts of the skin which are pressed into the slit of the casing. Even with these apparatus cutting of the skin by the blades is not avoided, for the former must enter the slit, however narrow this may be, and is thus liable to be cut. The present invention relates to an apparatus in which safety is insured by the fact that its action does not depend on the mowing effect of a blade, but rather on a kind of shearing action between two cutting edges, there being laid on the skin a very thin blade, against which is brought a cylinder provided with longitudinal helical grooves, so that a shearing action is produced between the blade and the edges of the said grooves when the cylinder is rotated. The blade has no play on the cylinder, so that the implement is a kind of endless knife. In shaving, the blade is laid firmly against the skin, whereby this, being elastic, is raised up, so that the hair on it is caught by the grooves of the cylinder, pressed against the blade, and cut off at its lowest part.

The accompanying drawings show different forms of shaving apparatus constructed in accordance with this invention.

Figure 1 is a transverse section through the cylinder and blade. Fig. 2 is a longitudinal section through an apparatus having two blades. Fig. 3 is a section on the line A B of Fig. 2. Figs. 4, 5, 6, and 7 show different arrangements of the blades.

Referring to Fig. 1, $a$ is a cylinder having any desired number of helical grooves $c$. $b$ is the blade, the edge $d$ of which lies against the cylinder. The cutting angle of the blade is that common in metal shears, which approaches a right angle. If the cylinder is rotated on the axis $x$, a shearing action occurs between the edges of the grooves and the edge $d$ of the blade.

In the usual form of the apparatus (shown in Figs. 2 and 3) it is advantageous to provide a second blade, with or without a cutting edge, so that a narrow slit is formed between the two blades. In these figures, $a$ is the cylinder. $b$ are two blades opposite each other. $c$ are the helical cutting-grooves. $d$ are the cutting edges of the blades. $e$ is the cylinder casing or guard. $f$, Fig. 3, is a spring for pressing the blades against the cylinder. $g$ is a handle, and $h$ is the gearing by means of which the cylinder is rotated on its axis $x$.

When there are two blades, shaving may be effected in whichever direction the cylinder is rotated. Obviously only one blade is in action at a time, while the other protects the skin from being cut.

In the modification shown in Fig. 4 the blades are formed in one with the casing or guard. Thus the grooved cylinder is completely surrounded by a sleeve in which the first moves without play. The grooved cylinder is hollow, and the grooves are cut through the cylindrical shell in places, so that the hair can fall into it. The lettering of this figure corresponds with that of Figs. 2 and 3.

A further form is shown in Fig. 5 in transverse section and in Fig. 6 in longitudinal section. In this case also there are two blades $b$, $a$ being the cylinder and $c$ the grooves thereon. The blades are springs fastened to the block $i$, but can be adjusted by means of the screws $k$, so that their cutting edges are parallel to the axis of the cylinder and fit closely to the latter without play. The distance between the blades and the cylinder is adjusted by means of the screw $l$, which engages in a cavity in the support $m$. $g$ are the handles, and $h$ the gearing by which the cylinder is rotated on the axis $x$.

Fig. 7 shows a section through another form in which there are four blades, so that the apparatus cuts on both sides and in both directions of rotation of the cylinder. The action of the apparatus and the lettering of the drawings are the same as in the previous cases.

It must be remarked that the grooves of the cylinder should not have too small an inclination to the axis of the cylinder; otherwise their action is prejudiced. Some fifteen degrees to twenty degrees is about the maximum.

In using this apparatus that part at which the narrow strip of the cylinder is exposed is pressed firmly against the skin, the cylinder is rotated, and the whole apparatus is moved in the direction contrary to that in which the cylinder is rotating. The helical grooves on the cylinder graze every part of the surface of the skin and shave it smooth.

The advantages of this apparatus are, first, that there is no razor-blade to be sharpened and stropped every time it is used, since the cutting edge of the cylinder-groove is well maintained and the blade need be sharpened only from time to time; second, that lathering is unnecessary; third, that skin wounds are avoided, and, fourth, that the instrument can be used in a bad light and by an unsteady hand and even in a rocking position.

The cylinder can be driven in any desired manner either from a special motor through a flexible shaft or by a mechanism, such as a spring-motor, in the apparatus itself. Generally it is best to locate the motor in the handle and to drive it by the pressure of the thumb or of the whole hand.

Having thus described the nature of this invention and the best means I know of carrying the same into practical effect, I claim—

1. A shaving apparatus consisting of a rotatable cylinder having helical grooves on its surface, and of a blade pressed against this cylinder in such manner that a shearing action occurs between the edge of the grooves and that of the blade, when the cylinder is rotated, substantially as described.

2. A shaving apparatus consisting of a rotatable cylinder having helical grooves on its surface, and of a blade pressed against this cylinder in such manner that a shearing action occurs between the edges of the grooves and the blade, when the cylinder is rotated, the said cylinder being inclosed in a guard-case which has a narrow opening parallel to the axis of the cylinder, one side of which opening is the cutting edge of the blade, substantially as described.

3. A shaving apparatus consisting of a rotatable cylinder having helical grooves on its surface and of two blades pressed against this cylinder in such manner that their cutting edges face each other and that a shearing action occurs between the edges of the grooves and that of one of the blades when the cylinder is rotated, the said cylinder being inclosed in a guard-case which has a narrow opening parallel to the axis of the cylinder, the sides of which opening are the cutting edges of the blades substantially as described.

4. A shaving apparatus consisting of a rotatable cylinder having helical grooves on its surface surrounded by a sleeve in which is a narrow slit parallel to the axis of the cylinder, the edges of such slit being formed as cutting-blades in such manner that a shearing action occurs between the edges of the grooves and one of the edges of the slit when the cylinder is rotated, substantially as described.

In witness whereof I have hereunto set my hand in presence of two witnesses.

HERMANN DRÖSSE.

Witnesses:
 WOLDEMAR HAUPT,
 HENRY HASPER.